United States Patent
Huang (10) Patent No.: US 12,529,578 B2
(45) Date of Patent: Jan. 20, 2026

(54) THRUST MONITORING IN A LINEAR DRIVE FOR INDEPENDENT CART SYSTEM

(71) Applicant: Rockwell Automation Technologies, Inc., Mayfield Heights, OH (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 440 days.

(21) Appl. No.: 18/152,888

(22) Filed: Jan. 11, 2023

(65) Prior Publication Data

US 2024/0230375 A1    Jul. 11, 2024

(51) Int. Cl.
*G01D 5/14*    (2006.01)
*H02K 41/02*    (2006.01)

(52) U.S. Cl.
CPC .............. *G01D 5/14* (2013.01); *H02K 41/02* (2013.01)

(58) Field of Classification Search
CPC ........................................................ G01D 5/14
See application file for complete search history.

(56) References Cited

U.S. PATENT DOCUMENTS

| | | | | |
|---|---|---|---|---|
| 4,897,582 | A * | 1/1990 | Otten ................... | H02K 41/031 310/12.32 |
| 8,502,958 | B2 * | 8/2013 | Makita ................ | G03F 7/70725 355/72 |
| 10,914,620 | B2 | 2/2021 | Huang et al. | |
| 11,186,302 | B2 | 11/2021 | Desotelle et al. | |
| 2021/0088081 | A1 | 3/2021 | Huang et al. | |
| 2021/0167713 | A1 * | 6/2021 | Kaufleitner ........... | B60L 3/0007 |
| 2021/0402881 | A1 * | 12/2021 | Hanis .................... | B60L 3/0061 |

FOREIGN PATENT DOCUMENTS

| | | | |
|---|---|---|---|
| JP | 06038503 | A * | 2/1994 |
| JP | 09308292 | A * | 11/1997 |
| KR | 20210091804 | A | 7/2021 |

OTHER PUBLICATIONS

European Extended Search Report for Application No. EP 24151424 dated May 22, 2024 (10 pages).
Song et al., "demagnetization Fault Detection for Double-Sided Permanent Magnet Linear Motor Based on Three-Line Magnetic Signal Signature Analysis," IEEE/ASME Transactions on Mechatronics, vol. 25, No. 2, Dec. 23, 2019 (pp. 815-827).

* cited by examiner

*Primary Examiner* — Walter L Lindsay, Jr.
*Assistant Examiner* — Milton Gonzalez
(74) *Attorney, Agent, or Firm* — Boyle Fredrickson, S.C.

(57) ABSTRACT

A level of thrust generated in a linear drive system is monitored by receiving an analog feedback signal at a controller from a position sensor mounted along a track for the linear drive system. The analog feedback signal varies as a function of a position of a mover traveling along the track, and the controller receives the analog feedback signal as the mover travels between a first position and a second position proximate the position sensor. An amplitude of the analog feedback signal corresponds to a value of thrust generated by the linear drive system for the mover. A change in the analog feedback signal from a nominal value of the analog feedback signal for the mover is detected as the mover travels between the first and second positions. Operation of the linear drive system is adapted when the change in the analog feedback signal exceeds a predefined threshold.

20 Claims, 8 Drawing Sheets

THRUST MONITORING IN A LINEAR DRIVE FOR INDEPENDENT CART SYSTEM

BACKGROUND INFORMATION

The subject matter disclosed herein relates to monitoring a level of thrust generated in a linear drive for an independent cart system. More specifically, systems and methods for detecting a level of thrust as a function of a position of a mover along a track segment and as a function of an air gap between the mover and the track segment are disclosed.

Motion control systems utilizing movers and linear drives in an independent cart system can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, or "movers," each supported on a track for motion along the track. The track is made up of a number of track segments that, in turn, hold individually controllable electric, drive coils. Successive activation of the drive coils establishes a moving electromagnetic field that interacts with a drive member on the movers and causes the mover to travel along the track. The drive member may be, for example, an array of permanent magnets mounted along a length of the mover.

Each of the movers may be independently moved and positioned along the track in response to the moving electromagnetic field generated by the drive coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

In some applications, the independent cart system may include many meters of track, extending along a process line, between a storage area and an assembly area within a facility, or other such applications. In order to reduce the cost of the system, it may be desirable to not provide drive coils for the linear drive system along the entire length of the track. Because the drive coils generate the electromagnetic filed used to propel the movers along the track, gaps between coils should be less than a width of a drive member mounted to the mover. If a gap between coils is less than the length of the magnet array, at least a portion of the drive member will always overlap one of the coils for the linear drive system.

However, if only a portion of the magnet array is positioned such that it interacts with an electromagnetic filed generated by the drive coils of the linear drive system, the amount of thrust that may be generated by the linear drive system is reduced when compared to operation of the mover with the entire magnet array positioned above the drive coils. This reduced interaction between the drive coils and the magnet array may result in speed fluctuations as a mover travels across a gap or potential stalling of a mover if it stops on a gap and does not have sufficient thrust to resume motion.

Thus, it would be desirable to provide a system and method for monitoring the amount of thrust available in the linear drive system as a function of the position of the mover along the track.

It would also be desirable to provide a system and method to increase the amount of thrust available if needed when a mover is positioned over a gap between drive coils.

It is also known that a level of thrust generated in a linear drive system is a function of an air gap between the drive coils and the drive member mounted on the mover. Over time, wear on wheels, glides, or other contacting surfaces between the track and the mover may change width of the air gap between the drive coils and the drive member. In particular, the width is typically reduced as the contacting members wear and the drive member on the mover becomes closer to the drive coils. The reduced width of the air gap causes an increased interaction of the electromagnetic field generated by the drive coils with drive member. The increased interaction causes an increased amount of thrust generated by the linear drive system than would be expected with the original air gap. The increased amount of thrust may generate instability in the control system which, in turn, may create effects such as overshoot, vibration, or the like during operation of the mover.

Thus, it would be desirable to provide a system and method for monitoring the amount of thrust available in the linear drive system as a function of the width of the air gap between the drive coils and the drive member mounted on the mover.

BRIEF DESCRIPTION

According to one embodiment of the invention, a method for monitoring thrust in a linear drive system includes receiving an analog feedback signal at a controller from a position sensor mounted along a track for the linear drive system. The analog feedback signal varies as a function of a position of a mover traveling along the track, and the controller receives the analog feedback signal as the mover travels between a first position and a second position proximate the position sensor. An area under a curve, generated by the analog feedback signal, is determined as the mover travels between the first position and the second position, and a value of thrust generated by the linear drive system is determined as a function of the area under the curve. Operation of the linear drive system is adapted responsive to the value of thrust exceeding a predefined threshold.

According to another embodiment of the invention, a system for monitoring thrust in a linear drive system includes a track, a mover, at least one position sensor, and a controller. The track includes multiple drive coils for the linear drive system, and the mover includes a drive member for the linear drive system. The drive member on the mover causes the mover to travel along the track responsive to a series of electromagnetic fields generated by each of the drive coils. Each position sensor is operative to generate an analog feedback signal as the mover travels past the position sensor. The controller is configured to receive the analog feedback signal from each position sensor, determine a value of thrust generated by the linear drive system as the mover travels between a first position and a second position proximate each position sensor as a function of the analog feedback signal, and adapt operation of the linear drive system responsive to the value of thrust exceeding a predefined threshold.

According to still another embodiment of the invention, a method for monitoring thrust in a linear drive system receives an analog feedback signal at a controller from a position sensor mounted along a track for the linear drive system. The analog feedback signal varies as a function of a position of a mover traveling along the track, and the controller receives the analog feedback signal as the mover travels between a first position and a second position proximate the position sensor. An amplitude of the analog feedback signal corresponds to a value of thrust generated by the linear drive system for the mover as the mover travels between the first position and the second position. A change is detected in the analog feedback signal from a nominal value of the analog feedback signal as the mover travels between the first position and the second position, and operation of the linear drive system is adapted when the change in the analog feedback signal exceeds a predefined threshold.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for monitoring the amount of thrust available in the linear drive system. The amount of thrust available in the linear drive system is a function of a number of variables, including a fill ratio and an air gap for each mover. The fill ratio corresponds to a percentage of a drive member mounted on the mover that is present within an electromagnetic field generated by the coils along the track. The drive member may be a magnet array which extends for at least a portion of the length of each mover. The coils are positions along the length of the track, but include gaps between coils. At the end of each track segment, for example, a short distance may exist without a coil present. The distance may similarly be repeated by the other end of an adjacent track segment. In certain applications, the coils may intentionally include additional gaps between coils, where the length of the drive member mounted on the mover has a sufficient length to span the gap and to interact with an electromagnetic field generated by the coils on either side of the gap between coils.

The air gap is a distance between the drive member on the mover and the coils present along the track. During commissioning of a system, the air gap may be set to a desired nominal distance. Over time, operation of the system may cause wear on wheels, bearings, slides, or other contacting surfaces, which cause the air gap to change. As the air gap gets smaller, the coils get closer to the drive member mounted on each mover and the resultant interaction of the drive member with the electromagnetic force generated by the coils increases. Thus, the amount of thrust generated by a coil may increase over time as an air gap decreases.

The controller receives a position feedback signal corresponding to a location of the mover along the track. As the mover travels along the track, the controller may use known geometries of the mover and track segments to determine a fill ratio for the mover at each position. Thus, the controller may determine a level of thrust present at each location as a function of the fill ratio. The position feedback signal is generated by a sensor configured to detect a magnetic field. Position magnets may be mounted on each mover in a location where they may be detected by the magnetic field sensors spaced apart along the track. Optionally, the magnetic field sensors may detect the magnetic field generated by the permanent magnet array used as the drive member mounted on each mover. As a mover travels along the track, the magnetic field sensor generates an analog signal which increases as the magnet approaches the sensor, reaches a peak value when the magnet is proximate the sensor, and decreases as the magnet leaves the sensor. The peak value generated by the sensor is a function of the strength of the magnetic field detected. As the air gap decreases, the magnets generating the magnetic field get closer to the magnetic field sensors and the peak value of the signal detected increases. Comparing the peak value of the analog signal to a nominal value of the signal allows the controller to detect a change in the air gap and, therefore, a change in the available thrust generated by each coil.

Figure 1:
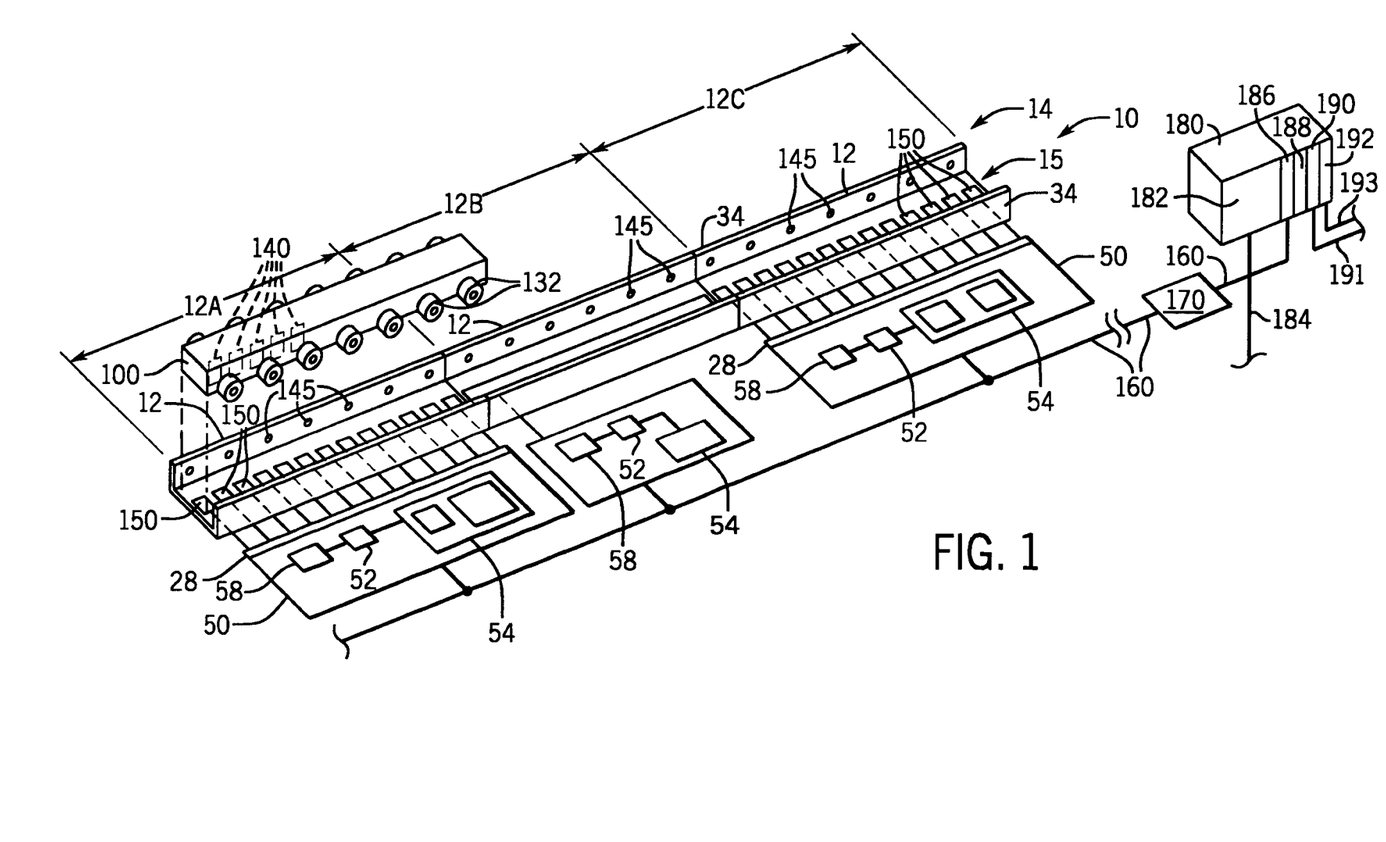
FIG. 1 is an exploded fragmentary perspective view of a simplified independent cart system showing alternating track sections with drive coils.

Turning initially to FIG. 1, an exemplary transport system for moving articles or products is an independent cart technology (ICT) system 10 with multiple track segments 12. According to the illustrated embodiment, multiple segments 12 are joined end-to-end to define the overall track configuration. The illustrated segments 12 are each straight segments having generally the same length. It is understood that track segments of various sizes, lengths, and shapes may be connected together to form the track 14 without deviating from the scope of the invention. In some applications, track segments 12 may be joined to form a generally closed loop supporting a set of movers 100 movable along the track 14. The track 14 is illustrated in a horizontal plane. For convenience, the horizontal orientation of the track 14 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 14 may be greater in either the horizontal or vertical direction according to application requirements. The movers 100 will travel along the track and take various orientations according to the configuration of the track 14 and the relationships discussed herein may vary accordingly.

The illustrated embodiment shows three track segments 12A-12C, where the first segment 12A and the third segment 12C include drive coils 150 while the second segment 12B does not have drive coils. The first and third segments 12A, 12C are positioned on either side of the second segment 12B and are assembled together into a unified track 14, being part of a larger track system. This pattern of alternating track segments 12 with and without drive coils may be continued throughout the track 14. Optionally, track segments 12B without drive coils 150 may be interspersed at differing or irregular intervals according to application requirements. The track segments 12B without coils may be provided to reduce an overall cost of the independent cart system. The track segments 12 are modular elements that can be readily reconfigured. In this regard, each track segment 12 may provide for releasable mechanical fasteners such as bolts and the like for mounting the track segments to each other or to a base structure provided under the track segments. Each track segment 12 may also include electrical connectors between track segments so that the track segments 12 can communicate with each other. The track segments 12 are modular elements that can be readily reconfigured.

A set of movers 100 (only one shown for clarity) may be positioned on the track 14 to move there along, for example, as supported by rollers 132 held within a guide channel 15 of the track segment 12 so that the mover 100 is constrained laterally to stay on the track 14, for example, by retaining wall 34 of the guide channel 15.

Each of the track segments 12A, 12C with drive coils 150 provide a portion of a stator of a linear drive system, where the electromagnetic drive coils 150 are spaced along a length of the track segment 12 and interact with a drive member mounted to each mover 100. The drive member may be a magnetic receptive material, such as a ferrous plate mounted to the mover, steel back iron and teeth, a magnetic material itself, such as an array of permanent magnets 120, or a combination of the afore-mentioned elements mounted on the mover 100. The magnetic receptive material may be sufficient in some applications to react to a moving magnetic field generated by the drive coils 150 and propel the mover 100. In other applications, the magnetic field generated by the permanent magnet array 120 provides an increased propulsive force to the mover 100 when the magnetic field is generated by the drive coils 150. Together the drive coils 150 and the drive member mounted to the mover 100 define a linear drive system motor that propels the movers 100 along the track 14 responsive to the selected energization of the drive coils 150. For convenience, the invention will be discussed with respect to a drive magnet array 120 being used as the drive member within each mover 100.

The permanent magnet array 120 in the mover 100 may include multiple drive magnets arranged in a block on the lower surface of each mover. The drive magnets include positive magnet segments, having a north pole, N, facing outward from the mover and negative magnet segments, having a south pole, S, facing outward from the mover. Various arrangements of the positive and negative magnet segments may be utilized. For example, two positive magnet segments may be located on the outer sides of the magnet array 120 and two negative magnet segments located between the two positive magnet segments. Optionally, the positive and negative motor segments may be placed in an alternating configuration throughout the magnet array 120. In still other embodiments, a single negative magnet segment may be located between the positive magnet segments. According to still another embodiment, the drive magnet array 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 2:
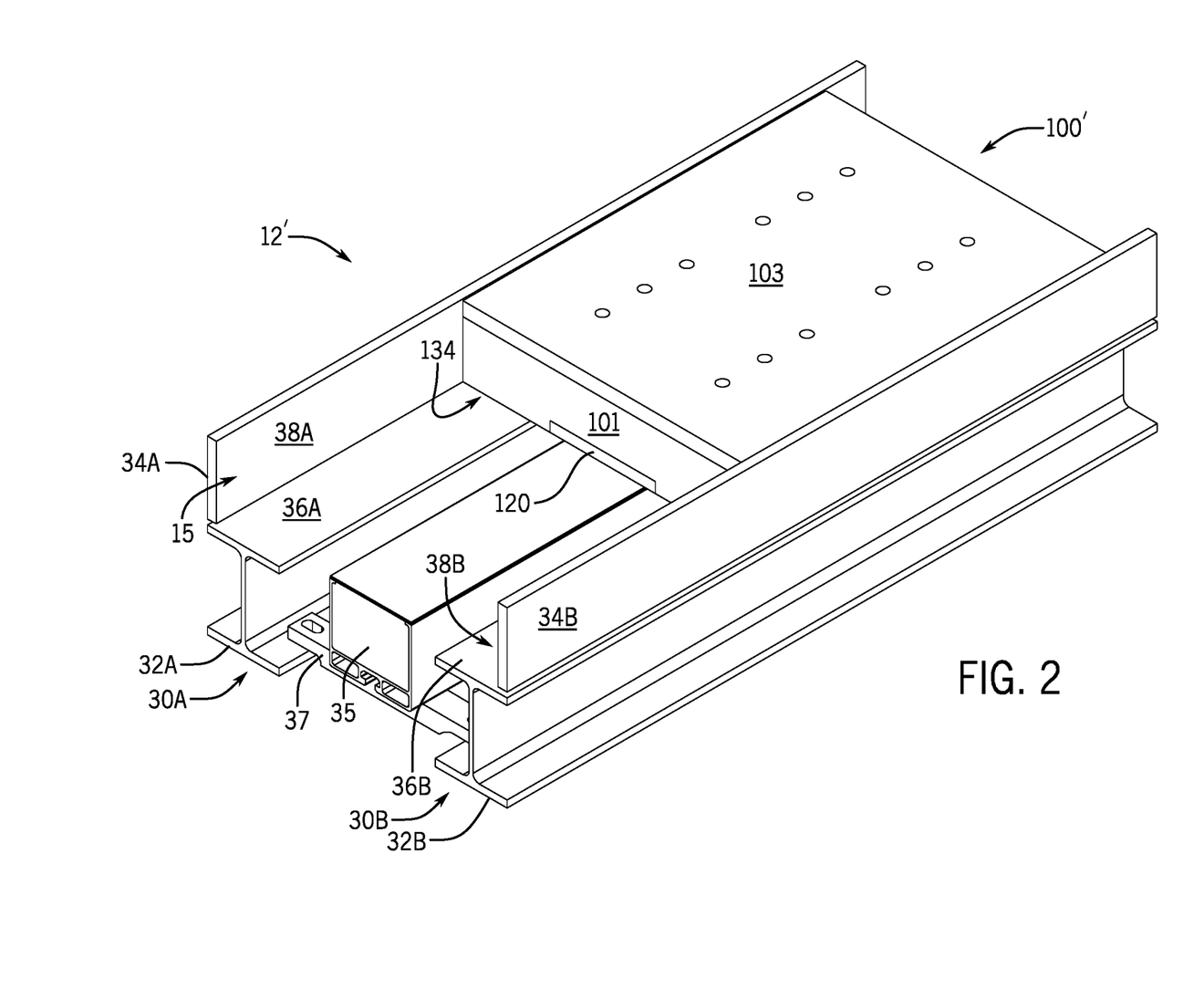
FIG. 2 is a perspective view of another embodiment of a mover and track segment of the independent cart transport system.

Referring next to FIG. 2, an alternate embodiment of a mover 100' and track segment 12' are illustrated. According to the embodiment illustrated in FIG. 2, each track segment 12' includes a first rail 30A and a second rail 30B. Each rail 30A, 30B includes a structural segment 32A, 32B and a guiding segment 34A, 34B. The illustrated structural segment 32 is an I-beam, and the illustrated guiding segment 34 is a metal side rail extending upward from the I-beam. By manufacturing each rail 30 independently, the independent cart system may easily be configured to accept movers 100' having different widths. The rails 30 are mounted in parallel along a desired path and at a desired spacing for the movers 100' according to an application's requirements. A series of mounting brackets 37 span the distance between the two rails 30 and a control module 35 is mounted on the mounting brackets 37. The control module 35 includes the coils 150 and a segment controller 50 for each track segment 12 mounted within the control module 35.

The mover 100' is configured to slide along an upper surface 36A, 36B of each I-beam 32A, 32B and is guided along the track by the inner surface 38A, 38B of each guiding segment 34A, 34B. The contacting surfaces of the movers 100' may be planar and made of a low friction material. It is contemplated that the surface may be, for example, nylon, Teflon®, aluminum, stainless steel and the like. In order to reduce sliding friction, it is contemplated that a sliding surface may protrude from the bottom of each mover 100' at the front and rear of each mover and along each side of the mover. The sliding surface may be, for example, a curved surface with a low profile, raising the mover 100' up a few millimeters to a few centimeters. The four sliding surfaces provide minimal contact with the top surface 36 of each I-beam, reducing the friction between the mover 100' and the I-beam. Similarly, one or more sliding surfaces may protrude from each side of the mover 100' to contact the side rails 30, reducing the friction between the mover 100' and each side rail. According to the illustrated embodiment, the mover 100' includes a body portion 101 and a mounting plate 103. The body portion 101 includes the drive member, such as the drive magnets 120, and any on-board control elements within the mover 100'. The mounting plate 103 is attached to the top of the body portion 101 and may be configured to include a fixture, or fixtures, for a payload to be mounted on the mover 100', tooling for interaction with a target external to the mover, or other sensors, actuators, and the like according to the application requirements. Connectors may be provided between the body 101 and the mounting plate 103 to provide control signals and/or feedback signals between the body 101 and the mounting plate 103. Drive magnets 120 are mounted along a bottom, drive surface 134 of the mover 100' such that they may engage the electromagnetic field generated by the coils 150 as they are energized by the segment controller 50.

Figure 3:
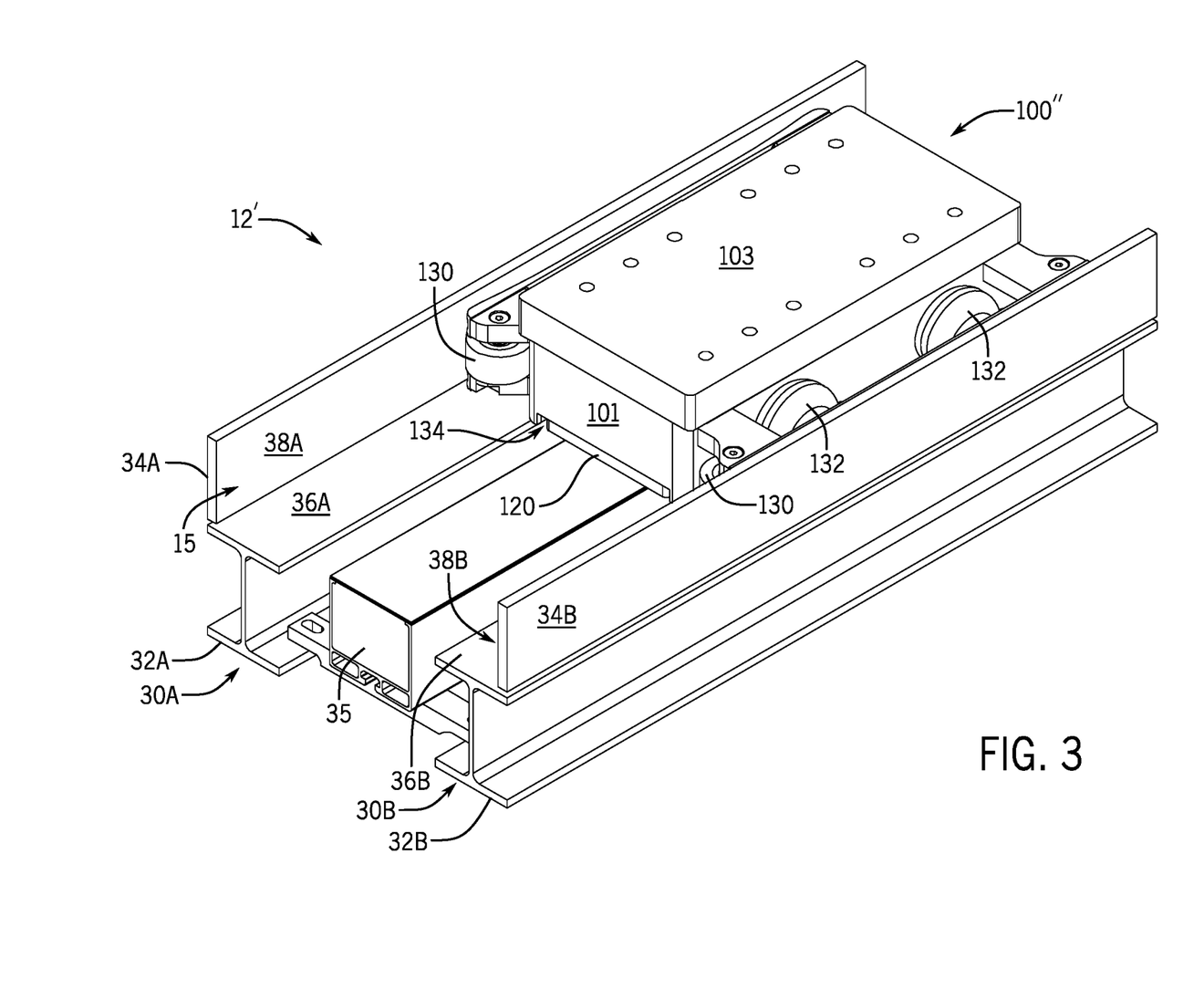
FIG. 3 is a perspective view of another embodiment of a mover with the track segment shown in FIG. 2 for the independent cart transport system.

Referring next to FIG. 3, still another embodiment of the mover 100" is illustrated. The mover 100" shown in FIG. 3 is configured to ride along the track segment 12 similar to the mover 100 shown in FIG. 1. The mover 100" in FIG. 3, however, includes wheels 130, 132 configured to roll along both a horizontal surface and a vertical surface. A first set of wheels 130 is mounted horizontally and is configured to engage the inner, vertical surfaces 38A, 38B of each rail 30A, 30B. A second set of wheels 132 is mounted vertically and is configured to engage the inner, horizontal surfaces 36A, 36B of each rail 30A, 30B. Rather than the single set of wheels 132 shown in FIG. 1, the two sets of wheels 132 are used to align the mover 100" within the channel 15 of the track segment 12' as the mover travels along the track.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. It is contemplated that each segment controller 50 may be mounted within a portion of the track segment 12. As discussed above with respect to FIGS. 2 and 3, the segment controller 50 may be mounted in a control module 35 mounted between rails 30. Each segment controller 50 is in communication with a central controller 170 and/or an industrial controller 180. The industrial controller may be, for example, a programmable logic controller (PLC) configured to control elements of a process line stationed along the track 14. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 191 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

A position feedback system provides knowledge of the location of each mover 100 along the length of the track segment 12 to the segment controller 50. With reference again to FIG. 1, the illustrated embodiment of a position feedback system includes one or more position magnets 140 mounted to the mover 100 and an array of sensors 145 spaced along the side wall of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145. The sensors 145 allow the position of each mover 100 to be determined for feedback control of the motion and positioning of the movers 100.

Figure 4:
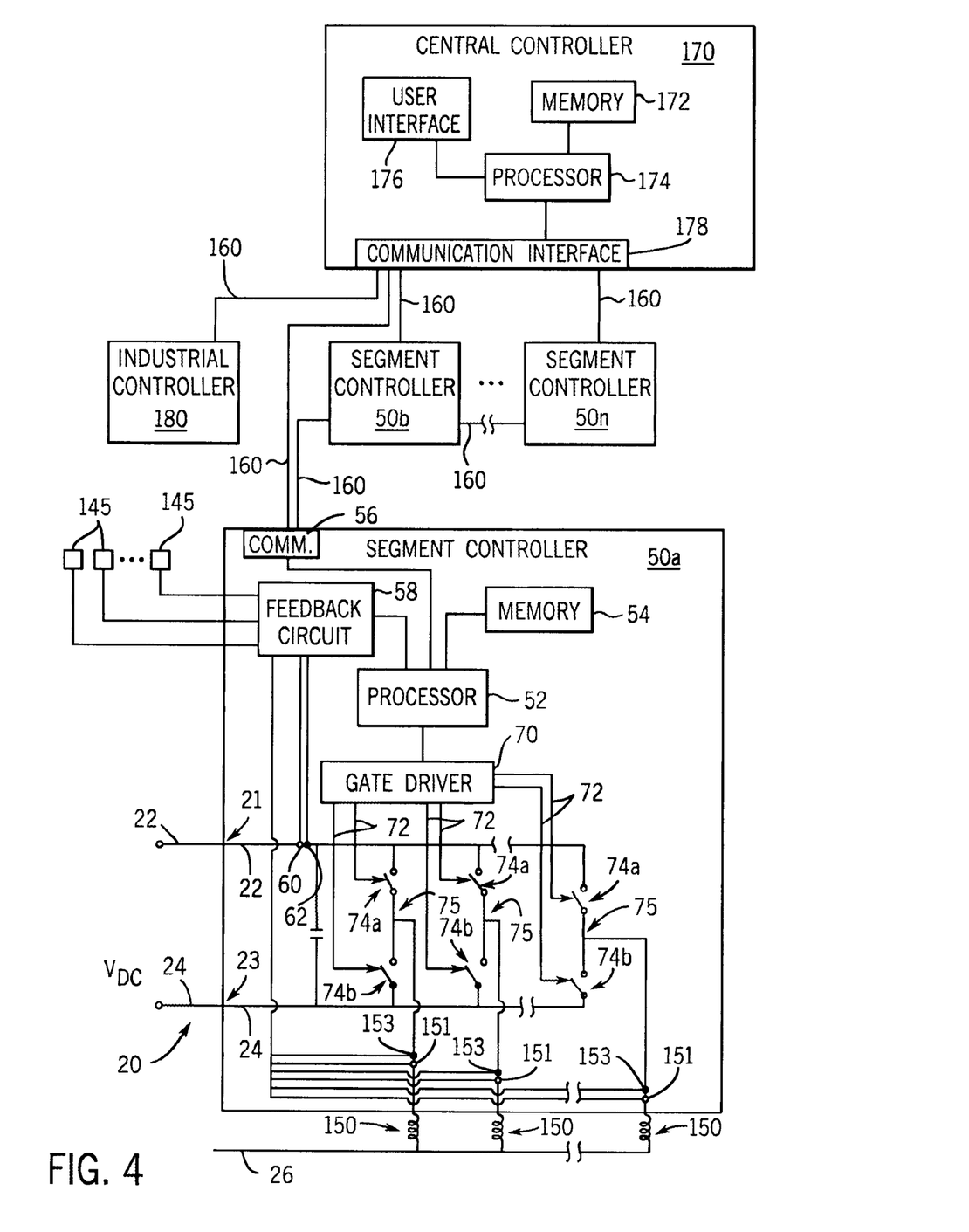
FIG. 4 is a block diagram representation of one embodiment of an exemplary control system for the independent cart system of FIG. 1.

With reference also to FIG. 4, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 14. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. According to one aspect of the invention, the DC bus 20 would extend within a lower portion of the track segment. Each track segment 12 includes connectors to which either the DC supply or another track segment may be connected such that the DC bus 20 may extend for the length of the track 14. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately providing positive or negative voltages to one the coils 150.

The power section in each segment controller 50 may include multiple legs, where each leg is connected in parallel between the positive rail 22 and the negative rail 24.

According to the embodiment illustrated in FIG. 4, three legs are shown arranged in a half-bridge configuration. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

Figure 5:
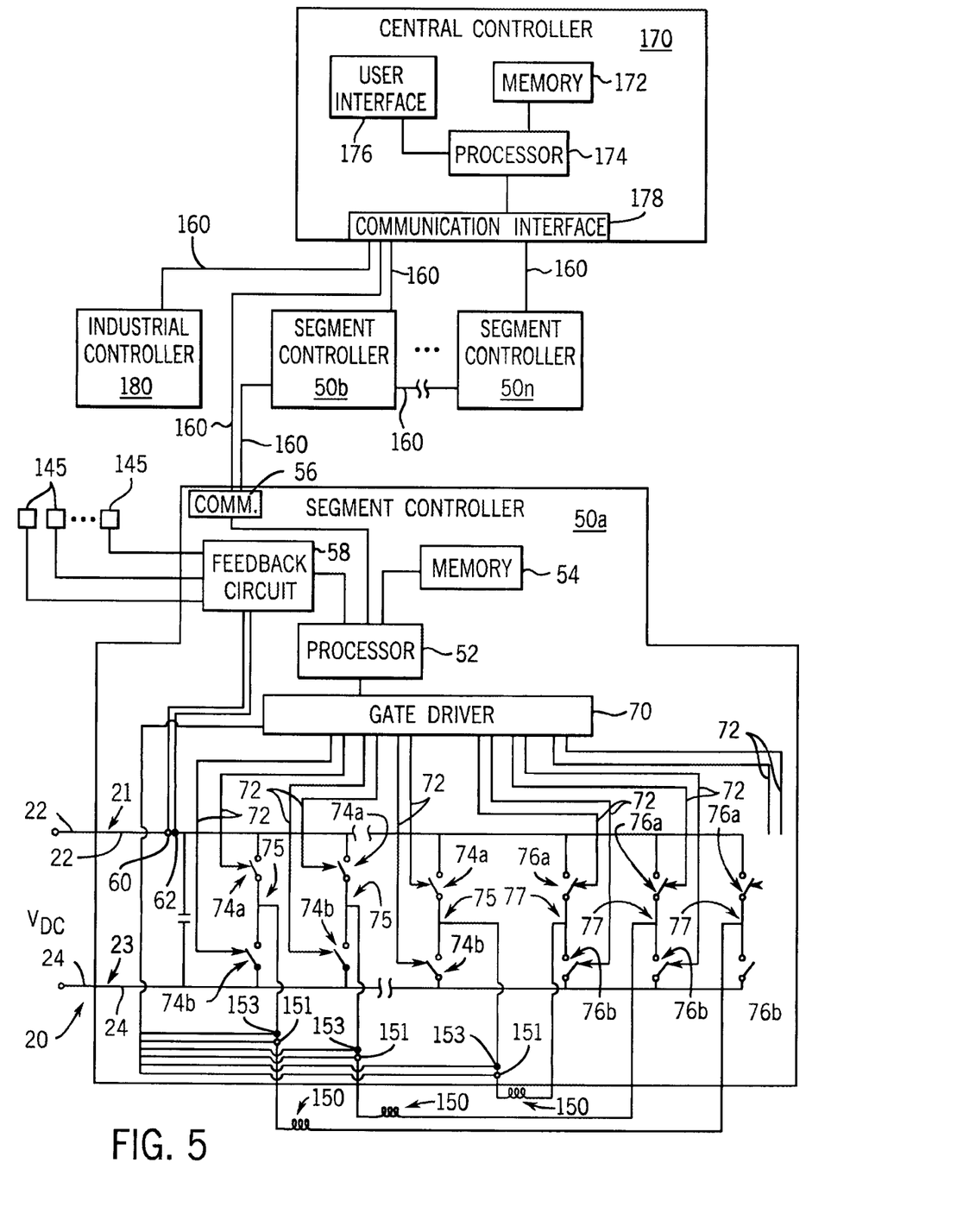
FIG. 5 is a block diagram representation of another embodiment of an exemplary control system for the independent cart system of FIG. 1.

According to the embodiment illustrated in FIG. 5, three legs are shown arranged in a full-bridge configuration. Again, the number of legs may vary and will correspond to the number of coils 150 extending along the track segment 12. Each leg includes a first switching device 74a and a second switching device 74b connected in series on one side of the coil 150. The first and second switching devices 74a, 74b are connected between the positive rail 22 and the negative rail 24 with a first common connection 75 between the first and second switching devices 74a, 74b. The first common connection 75 is connected to the first side of the coil 150. Each leg further includes a third switching device 76a and a fourth switching device 76b connected in series on the other side of the coil 150. The third and fourth switching devices 74a, 74b-76a, 76b are connected between the positive rail 22 and the negative rail 24 with a second common connection 77 between the first and second switching devices 74a, 74b. The second common connection 77 is connected to the second side of the coil 150. The first and third switching devices 74a, 76a in each leg may also be referred to herein as upper switches, and the second and fourth switching devices 74b, 76b in each leg may also be referred to herein as lower switches. The terms upper and lower are relational only with respect to the schematic representation and are not intended to denote any particular physical relationship between the switching devices. The switching devices 74, 76 include, for example, power semiconductor devices such as transistors, thyristors, and silicon-controlled rectifiers, which receive the switching signals 72 to turn on and/or off. Each of switching devices 74, 76 may further include a diode connected in a reverse parallel manner between the first or second common connection 75, 77 and either the positive or negative rail 22, 24.

With reference again to FIG. 4, the processor 52 may also receive feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

In operation, the segment controller 50 is configured to control operation of each mover 100 located on the corresponding track segment 12. The segment controller receives a command signal corresponding to desired operation of the mover 100. The command signal may be a desired location along the track at which the mover 100 is to be positioned. The segment controller 50 may then be configured to generate a motion profile to drive the mover 100 from its present location to the desired location. Alternately, the motion command may be a motion profile generated, for example, by the central controller 170 or the industrial controller 180 and transmitted to the segment controller 50. The segment controller 50 then provides the motion profile to an internal control module executing on the processor 52 to achieve desired operation of the mover 100.

Figure 6:
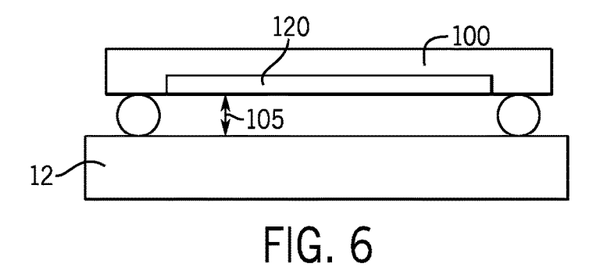
FIG. 6 is a side elevation view illustrating an exemplary air gap between a mover and a track segment.

As the mover 100 is travelling along the track 14, each segment controller 50 is configured to monitor the feedback signals from the position sensors 145 to determine an air gap 105 present between mover 100 and the track segment 12 on which the mover is presently located. With reference to FIG. 6, the air gap 105 is illustrated between a lower surface of the mover 100 and an upper surface of the track segment 12. The coils 150 are typically mounted within a housing, such as the control module 35 shown in FIGS. 2 and 3, or in another housing with a steel plate covering the coils 150 to prevent contact with and contamination of the coils 150. Similarly, the drive magnets 120 may be located within a housing of the mover 100 or positioned at the lower surface of the mover 100. For discussion herein, the air gap for the linear drive system includes the air gap between the lower surface of the mover 100 and the upper surface of the track segment 12 but may further include the thickness of a housing covering the drive coil 150, a thickness of a housing covering the drive magnets 120, a spacing of the coils 150 or drive magnets away from any associated covering, or a combination thereof.

Figure 7:
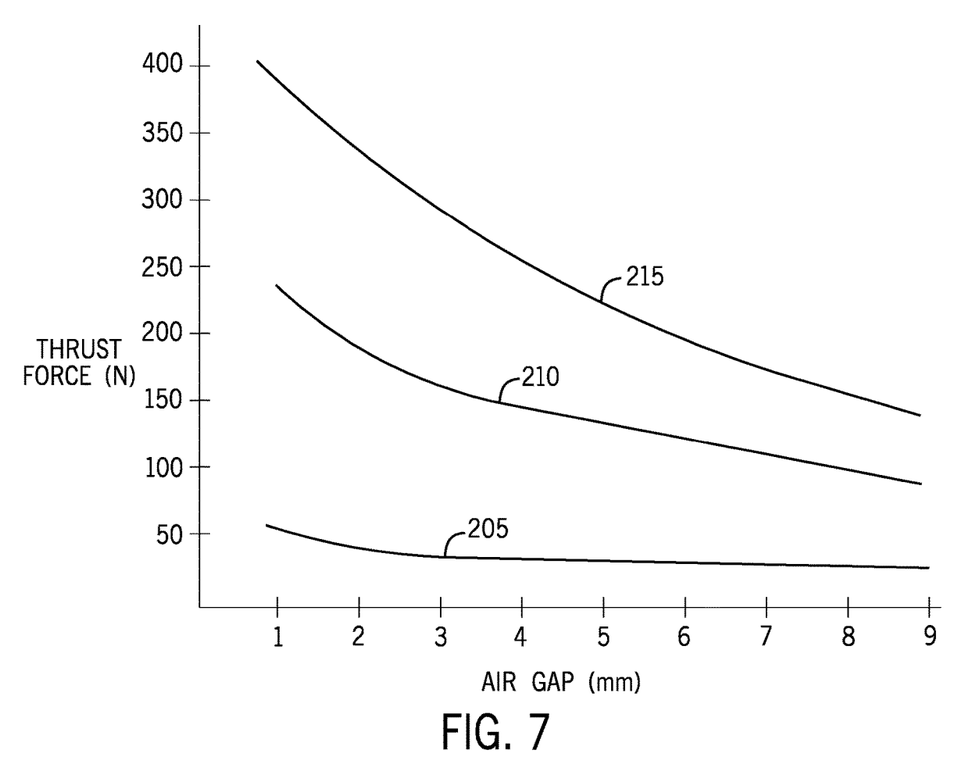
FIG. 7 is a graphical representation of a thrust force generated by a linear drive system as a function of a varying width of the air gap of FIG. 6 for different size magnet arrays mounted on a mover.

With reference to FIG. 7, an amount of thrust generated by the linear drive system is illustrated with respect to multiple configurations of drive magnets 120 and varying air gaps within the linear drive system. A first plot 205 illustrates a shorter length array of drive magnets 120 interacting with the electromagnetic fields generated by the drive coils 150. The thrust generated by the drive magnets 120 increases about one hundred percent as the air gap changes from nine millimeters to one millimeter. A second plot 210 illustrates a medium length array of drive magnets 120 and a third plot 215 illustrates a longer length array of drive magnets 120 interacting with the same electromagnetic fields generated by the drive coils 150. As the length of the drive magnets 120 increases, the strength of the magnetic field generated by the magnets similarly increases, thereby increasing the magnitude of the thrust generated by the linear drive system. Each of the second and third plots 210, 215 similarly illustrate the amount of thrust being generated by the linear drive system approximately doubles as the size of the air gap changes from nine millimeters to one millimeter. Thus, as the surface of wheels or other contacting surfaces wear during operation and the air gap narrows, the amount of thrust being generated by the linear drive system may change significantly. This change may produce unexpected operating performance in the independent cart system. Therefore, it is desirable to determine the width of the air gap 105 in order to determine the amount of thrust generated by the linear drive system.

Figure 8:
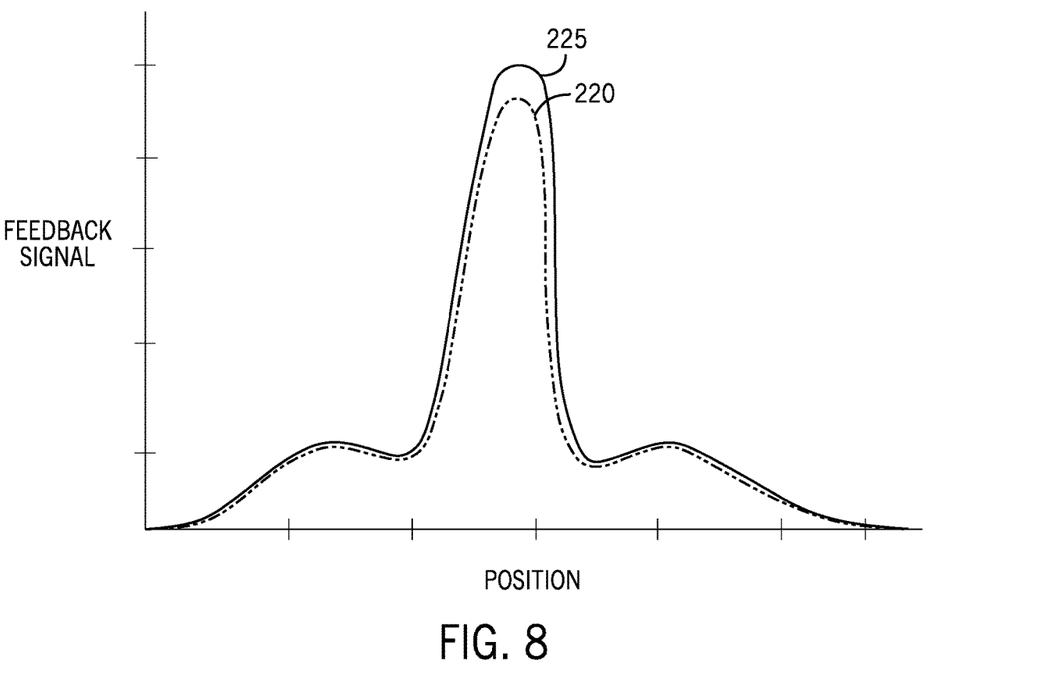
FIG. 8 is a graphical representation of an analog feedback signal from a position sensor corresponding to different widths of the air gap of FIG. 6.

A first method for detecting a change in the air gap 105 utilizes a peak value of the feedback signal from one of the position sensors 145. Turning next to FIG. 8, an exemplary analog feedback signal from one of the position sensors is illustrated. A first plot 220 of the analog feedback signal corresponds to a nominal expected value of the feedback signal as a mover 100 travels past the sensor 145. The position sensor 145 generates a signal corresponding to this first plot 220 when a mover 100 is initially commissioned in the independent cart system and the air gap 105 between the mover 100 and the surface of the track 14 is at an expected value. As indicated above, the position sensors 145 are magnetic field sensors and detect either position magnets 140 mounted on each mover 100 or may be arranged to detect drive magnets 120 as mover 100 travels past the sensor. In either instance, the peak value of the position feedback signal changes as the air gap 105 decreases and the magnets being detected by the sensor 145 get closer to the sensor. The second plot 225, therefore, illustrates the analog feedback signal for the same mover 100, which generates the analog feedback signal of the first plot 220, when the air gap 105 between the mover 100 and the surface of the track has decreased. This change in the magnitude of the feedback signal as a function of the air gap 105 may be used to detect a change in the air gap 105 over time.

Figure 9:
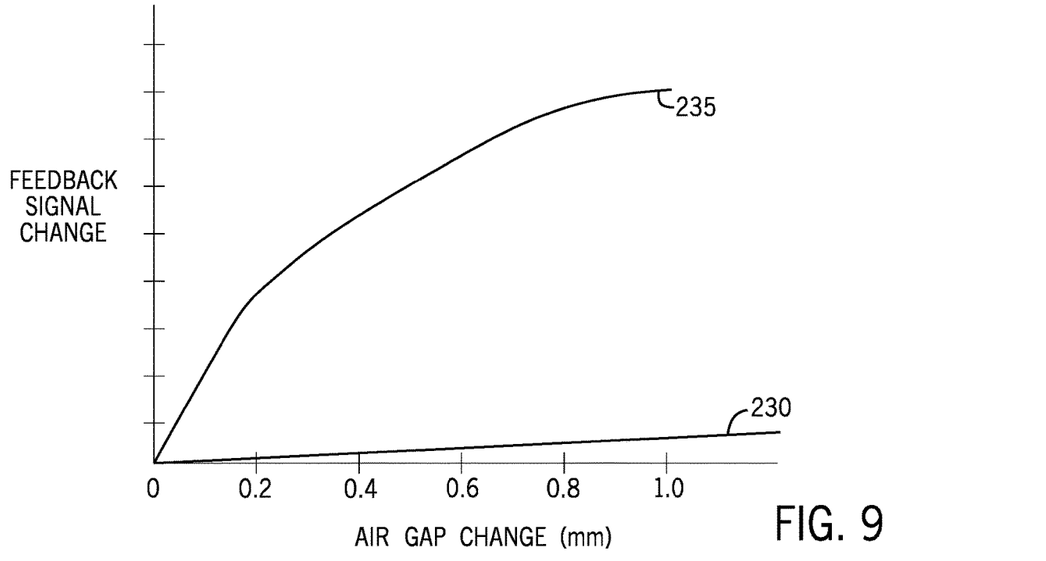
FIG. 9 is a graphical representation of multiple methods of detecting a change in the feedback signal from the position sensor.

With reference also to FIG. 9, the magnitude of change in the feedback signal as the air gap 105 changes is illustrated. A first plot 230 in FIG. 9 illustrates a change in the maximum value of the feedback signal as a function of the change in the air gap 105. It is noted that the change in the peak value is approximately linear as the width of the air gap 105 changes. A segment controller 50 may store a table of values in memory 54, where the table includes an expected increase in thrust for a predefined change in the peak value of the feedback signal. Due to the relative linearity of the change in the feedback signal with respect to the change in the air gap, the segment controller 50 may further be configured to read a peak value of feedback signal from a position sensor 145 as a mover 100 travels past the position sensor and then interpolate between two stored values in the table to determine an actual amount of change in the air gap 105 from the nominal peak value. The segment controller 50 may also store a table of values corresponding to the graph shown in FIG. 7 such that the segment controller 50 may determine a value of thrust being generated by the linear drive system based on the determined width of the air gap 105.

With reference again to FIG. 9, it is noted that the relative change in the peak value of the feedback signal is small as the air gap changes. The present inventors have determined that integrating the analog feedback signal 220, 225 to determine an area under a curve of the feedback signal with respect to position provides an increased resolution for determining the change in the air gap 105. A second plot 235 in FIG. 9, corresponds to a change in the area under the curve 220, 225 as the air gap changes. The segment controller 50 is configured to integrate the position feedback signal. A hardware integrator circuit such as an operational amplifier circuit or the like may be utilized. Optionally, the position feedback signal may be sampled at a periodic interval by the segment controller 50. The sampled value may be provided as an input to an integrator module executing on the processor 52 for the segment controller 50. According to still another aspect of the invention, the integration may be approximated, for example, by maintaining a running total of the sampled value multiplied by a duration of the periodic interval at which the position feedback signal is sampled. Regardless of the method by which the position feedback signal is integrated, a change in the width of the air gap 105 results in a significantly greater difference of the total area under the curve from a nominal area under the curve as a mover 100 passes the position feedback sensor 145 than the difference in just the peak value of the position feedback signal from a nominal peak value. The greater difference between values allows for a more precise determination of the change in air gap.

Using either the peak value of the feedback signal or the area under a curve of the feedback signal, the segment controller 50 monitors a thrust force being generated by the linear drive system. As the segment controller 50 controls the linear drive system to propel a mover 100 along the corresponding track segment 12, the segment controller 50 monitors the feedback signal from one or more of the position feedback sensors 145 spaced apart along the length of the track segment 12. The segment controller 50 monitors each feedback signal for a peak value of the feedback signal or determines an area under the curve generated by the feedback signal as the mover travels along the track segment past the respective feedback sensor 145. The peak value and/or the area under the curve is compared to a nominal value to determine an air gap 105 between the track segment 12 and the mover 100 at the location of each position feedback sensor 145. Once the air gap 105 is determined, the segment controller 50 may determine a value of thrust being generated by the linear drive system as a result of the size of the air gap 105.

The segment controller 50 is further configured to adapt operation of the linear drive system in response to determining the value of thrust being generated. According to a first aspect of the invention, the segment controller 50 may be configured to execute a safety operation in response to determining the value of thrust generated by the linear drive system. The safety operation puts the segment controller into a safe operating mode responsive to determining the value of thrust. The safe operating mode may be a limited torque operating mode or a safe torque off operating mode. In a limited torque operating mode, the segment controller 50 is configured to limit a level of thrust generated by the linear drive system. As the air gap 105 decreases, the segment controller 50 may reduce a maximum current value from full rated current to a limited percentage of full rated current. By limiting the current output, the actual thrust generated by the linear drive system may be restricted to an expected level of thrust when the air gap 105 is at its nominal value rather than the increased level of thrust experienced as wear in the system reduces the air gap. Alternately, the segment controller 50 may enter a safe torque off operating state. In the safe torque off operating state, the segment controller 50 brings a mover 100 to a controlled stop when the level of thrust exceeds a predefined threshold. The predefined threshold may be a parameter setting stored in memory 54 of the segment controller 50 during commissioning and corresponds to a level of thrust above which performance of the mover 100 may degrade as a result of an unexpected level of thrust generated by the linear drive system.

According to another aspect of the invention, the segment controller 50 may be configured to dynamically adjust at least one value of a controller gain for the linear drive system as the mover is travelling along the track in response to determining the value of thrust generated by the linear drive system. During commissioning controller gains are selected for each control loop executing in the segment controller 50. The control loops may include a position loop, a velocity loop, a torque loop, or a combination thereof. The control loops may further be arranged in a cascaded manner with a first control loop receiving a reference value and a feedback value and generating an output signal which, in turn, becomes a reference value for a second control loop. The control loops may also include feedforward signals, generated by the industrial controller 180 and transmitted to each segment controller 50 in a motion profile or generated internally within the segment controller 50. The output of the initial control loops generate a current reference signal which is, in turn, provided to a current regulator to regulate the amplitude of current in the coils 150 of the linear drive system. The amplitude of current corresponds to a strength of the electromagnetic field generated by the coil and, in turn, a level of thrust generated by the linear drive system. Each control loop may include a proportional gain, an integral gain, a derivative gain, or a combination thereof. Selecting the gains for each control loop is commonly performed as part of an initial tuning process for the independent cart system. The control gains are selected to achieve desired operation of the movers 100 as they travel along the track 14. Because the controller gains are dependent on the level of thrust generated by the linear drive system, a controller gain selected for desired operation at a first level of thrust may not provide the desired operation at a second level of thrust. As the air gap 105 decreases, the level of thrust generated by the linear drive system increases for the same level of current being supplied to the coils 150. While the segment controller 50 may initially be configured to generate a particular level of current in the coils 150 to achieve desired operation with the original air gap 105 present between the mover 100 and the track segment 12, the level of thrust increases as the air gap 105 decreases and instability in the control system may occur due to a more rapid response of the mover 100 to the same command. Consequently, the segment controller 50 may be configured to dynamically adapt controller gains at locations where the segment controller 50 detects a change in the feedback signal from the position feedback sensor 145. Multiple values for controller gains may be stored in memory 54 of the segment controller 50. As the mover 100 travels past a position feedback sensor 145, the segment controller 50 determines a change in the air gap 105 and a corresponding change in the level of thrust generated by the linear drive system, as discussed above. Based on the level of thrust, the segment controller 50 selects a desired set of controller gains for use in the control loops. Optionally, the control loops may include an additional gain term. The additional gain term may initially be set to a unity gain and the segment controller 50 adjusts the value of the additional gain term as a function of the level of thrust generated by the linear drive system to adapt the controller gains. The new controller gains provide stable operation of the mover 100 along the track segment 12 with the increased level of thrust.

According to still another aspect of the invention, the segment controller 50 may be configured to execute a touchdown prevention routine in response to determining the value of thrust generated by the linear drive system. As the mover 100 travels past a position feedback sensor 145, the segment controller 50 determines a change in the air gap 105, as discussed above. However, rather than determining a level of thrust, the segment controller 50 monitors the width of the air gap 105. If the air gap 105 were to reduce to a zero width, the lower surface of the mover 100 would contact the upper surface of the track segment 12. Such contact would, at a minimum, create drag between the mover 100 and the track segment, requiring additional thrust from the linear drive system to overcome the drag. Such contact could, however, cause damage to the mover 100. The segment controller 50 may monitor the width of the air gap 105 and, when the width becomes less than a predefined value send a message to an operator indicating maintenance on the wheels, or other contacting surface, is required to restore the original air gap. The segment controller 50 may also cause the track segment to enter a safe operating state, such as the safe torque off operating state, to prevent further operation of the mover 100 until maintenance may be performed and to prevent damage to the mover 100 from occurring.

Figure 10:
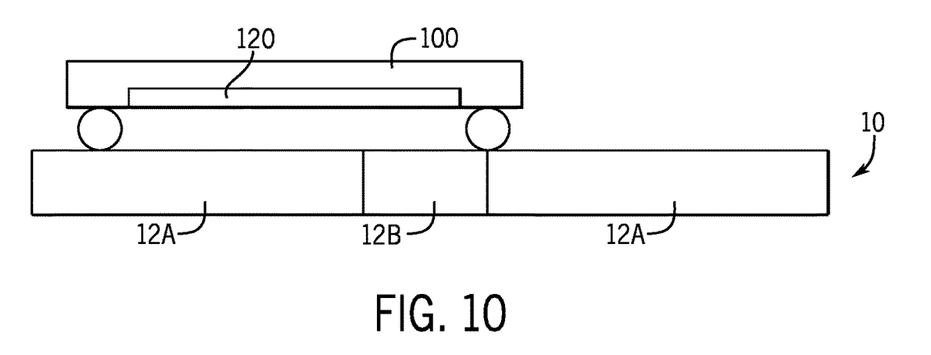
FIG. 10 is a side elevation view illustrating a first exemplary fill ratio for a magnet array on a mover over multiple track segments.
Figure 11:
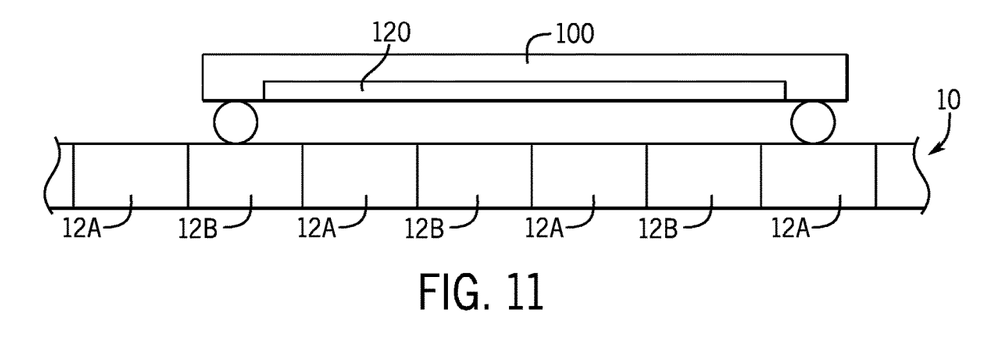
FIG. 11 is a side elevation view illustrating a second exemplary fill ratio for a magnet array on a mover over multiple track segments.

According to still another aspect of the invention, the segment controller 50 may also be configured to monitor a level of thrust available as a function of a fill ratio for the linear drive system. The fill ratio is determined as a function of the size of the drive magnets 120 mounted on each mover 100 and the position of the drive magnets 120 with respect to the coils 150 spaced along the track 14. As discussed above, certain track segments 12A, 12C may include coils while other track segments 12B may not include coils. Further, those track segments 12A, 12C with coils may have regions at each end of the track segment in which no coil is present. Referring to FIGS. 10 and 11, two exemplary systems are illustrated with a mover 100 present on a track which includes track segments both with and without coils. In FIG. 10, the mover 100 may be approximately the same length, or even shorter than, a track segment 12A in which coils 150 are present. Shorter track segments 12B without coils may be interspersed between the track segments 12A with coils. The length of each mover 100 is greater than the length of the track segments 12B without coils, such that the drive magnets 120 are always positioned, at least in part, over drive coils 150 to interact with electromagnetic fields generated by those drive coils. In certain applications, the mover 100 may extend up to several meters in length and span multiple track segments 12A, 12B. In the illustrated example of FIG. 11, the track segments 12B without coils are approximately equal in length to track segments 12A with coils. It is contemplated that identical housing for each track segment 12A, 12B may be utilized with alternating track segments 12A being populated with coils 150. In the example of FIG. 11, the drive magnets 120 will always span at least one and, as illustrated, at least two track segments 12A including drive coils. Similar to the example of FIG. 10, the drive magnets 120 are always positioned, at least in part, over drive coils 150 such that they may interact with electromagnetic fields generated by those drive coils.

As the mover 100 travels along the track 14, the segment controller 50 may determine a fill ratio for each mover 100. The segment controller 50 has knowledge of the position of coils 150 located on the corresponding track segment 12 and may further have knowledge of the position of coils on adjacent track segments 12 as needed. The segment controller 50 also has knowledge of the configuration of each mover 100 travelling along the track segment 12. The structure of the coils and movers may be stored in data tables in memory 54 on each segment controller 50, and the processor 52 may read the stored data from the data tables. The segment controller 50 monitors the position feedback for each mover 100 to determine the present location of the mover along the corresponding track segment 12. Based on the present location of the mover 100, the configuration of the magnet array 120 mounted on the mover, and the location of coils 150 along the track segment 12, the segment controller 50 determines a fill ratio for the mover 100, where the fill ratio indicates a percentage of the magnet array 120 that is positioned above a coil 150 and able to interact with the electromagnetic field generated by the coil 150.

In a manner similar to dynamically adjusting controller gains due to the detected air gap, the segment controller 50 may also be configured to dynamically adjust at least one value of a controller gain for the linear drive system as the mover 100 is travelling along the track in response to determining the fill ratio of the mover at the present location. The amount of thrust available to drive the mover 100 varies as a function of the fill ratio. As a mover 100 reaches the end of a track segment 12A with coils, a region at the end of the track segment may not have coils present due to the physical construction of each track segment and the presence of housing and/or connector members present on the ends of each track segment. Even in systems where adjacent track segments 12A each have coils 150 present, the fill ratio may change during a transition between track segments. The fill ratio may change more significantly in systems where a track segment 12B without coils is interspersed between track segments 12A, 12C with coils 150. The control gains may initially be selected to achieve desired operation of the movers 100 as they travel along the track 14 at a specific fill ratio. The nominal fill ratio may be one, where the majority of the track 14 includes coils 150. Optionally, the nominal fill ratio may be one-half where alternating track segments include coils and have no coils. Still other nominal fill ratios may be selected according to the track configuration. Because the controller gains are dependent on the level of thrust generated by the linear drive system, a controller gain selected for desired operation at the nominal fill ratios may not provide the desired operation at other fill ratios. As the fill ratio changes, the level of thrust generated by the linear drive system may increase or decrease for the same level of current being supplied to the coils 150. Consequently, the segment controller 50 may be configured to dynamically adapt controller gains along the track 14 as a function of the fill ratio. Multiple values for controller gains may be stored in memory 54 of the segment controller 50. As the mover 100 travels along the track 14, the segment controller 50 determines the fill ratio and selects a desired controller gain as a function of the fill ratio. Optionally, the control loops may include an additional gain term. The additional gain term may initially be set to a unity gain and the segment controller 50 adjusts the value of the additional gain term to adapt the controller gains as a function of the fill ratio determined by the segment controller 50. The new controller gains provide stable operation of the mover 100 along the track segment 12 with the varying fill ratios.

The amount of thrust available in the linear drive system is a function of a number of variables, including a fill ratio and an air gap for each mover. The fill ratio corresponds to a percentage of a drive member mounted on the mover that is present within an electromagnetic field generated by the coils along the track. The drive member may be a magnet array which extends for at least a portion of the length of each mover. The coils are positions along the length of the track, but include gaps between coils. At the end of each track segment, for example, a short distance may exist without a coil present. The distance may similarly be repeated by the other end of an adjacent track segment. In certain applications, the coils may intentionally include additional gaps between coils, where the length of the drive member mounted on the mover has a sufficient length to span the gap and to interact with an electromagnetic field generates by the coils on either side of the gap.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method for monitoring thrust in a linear drive system, comprising the steps of:
    receiving an analog feedback signal at a controller from a position sensor mounted along a track for the linear drive system, wherein:
        the analog feedback signal varies as a function of a position of a mover traveling along the track, and
        the controller receives the analog feedback signal as the mover travels between a first position and a second position proximate the position sensor;
    sampling a plurality of values of the analog feedback signal between the first position and the second position with the controller, wherein:
        each of the plurality of values corresponds to a different position of the mover, and
        the plurality of values of the analog feedback signal plotted with respect to the corresponding different position of the mover define a curve;
    determining an area under the curve generated by the analog feedback signal as the mover travels between the first position and the second position;
    determining a value of thrust generated by the linear drive system as a function of the area under the curve; and
    adapting operation of the linear drive system responsive to the value of thrust exceeding a predefined threshold.

2. The method of claim 1, wherein the step of adapting operation of the linear drive system responsive to the value of thrust exceeding the predefined threshold further comprises entering a safe torque off operating mode with the controller for the linear drive system.

3. The method of claim 1, wherein the step of adapting operation of the linear drive system responsive to the value of thrust exceeding the predefined threshold further comprises dynamically changing at least one value of a controller gain for the linear drive system as the mover is travelling along the track.

4. The method of claim 1, wherein the step of adapting operation of the linear drive system responsive to the value of thrust exceeding the predefined threshold further comprises dynamically reducing a maximum current limit for the linear drive system as the mover is travelling along the track.

5. The method of claim 1, wherein the step of determining the area under the curve generated by the analog feedback signal as the mover travels between the first position and the second position further comprises the steps of:
   sampling a value of the analog feedback signal with the controller at a periodic interval; and
   integrating the value sampled at a plurality of periodic intervals as the mover travels between the first position and the second position.

6. The method of claim 1, wherein the step of determining the area under the curve generated by the analog feedback signal as the mover travels between the first position and the second position further comprises the steps of:
   sampling a value of the analog feedback signal with the controller at a periodic interval;
   multiplying the value sampled by a duration of the periodic interval; and
   adding a product from the multiplying step to a summation of products as the mover travels between the first and the second position.

7. The method of claim 1, wherein the mover includes at least one magnet mounted on the mover and the position sensor generates the analog feedback signal as a function of the at least one magnet passing by the position sensor.

8. A system for monitoring thrust in a linear drive system, comprising:
   a track including a plurality of drive coils for the linear drive system;
   a mover including a drive member for the linear drive system, wherein the drive member on the mover causes the mover to travel along the track responsive to a series of electromagnetic fields generated by each of the plurality of drive coils;
   at least one position sensor mounted along the track, wherein the at least one position sensor is operative to generate an analog feedback signal as the mover travels past the at least one position sensor;
   a controller configured to:
      receive the analog feedback signal from the at least one position sensor;
      sample a plurality of values of the analog feedback signal as the mover travels past the at least one position sensor, wherein:
         each of the plurality of values corresponds to a different position of the mover, and
         the plurality of values of the analog feedback signal plotted with respect to the corresponding different position of the mover define a curve;
      determine a value of thrust generated by the linear drive system as the mover travels between a first position and a second position proximate the at least one position sensor as a function of the curve; and
      adapt operation of the linear drive system responsive to the value of thrust exceeding a predefined threshold.

9. The system of claim 8, wherein the controller is further configured to adapt operation of the linear drive system responsive to the value of thrust exceeding the predefined threshold by entering a safe torque off operating mode for the linear drive system.

10. The system of claim 8, wherein the controller is further configured to adapt operation of the linear drive system responsive to the value of thrust exceeding the predefined threshold by dynamically changing at least one value of a controller gain for the linear drive system as the mover is travelling along the track.

11. The system of claim 8, wherein the controller is further configured to adapt operation of the linear drive system responsive to the value of thrust exceeding the predefined threshold by dynamically reducing a maximum current limit for the linear drive system as the mover is travelling along the track.

12. The system of claim 8, wherein the controller is further configured to determine the value of thrust generated by the linear drive system by determining a maximum value of the analog feedback signal as the mover travels between the first position and the second position.

13. The system of claim 8, wherein the controller is further configured to determine the value of thrust generated by the linear drive system by determining an area under the curve generated by the analog position feedback signal as the mover travels between the first position and the second position.

14. A method for monitoring thrust in a linear drive system, comprising the steps of:
   receiving an analog feedback signal at a controller from a position sensor mounted along a track for the linear drive system, wherein:
      the analog feedback signal varies as a function of a position of a mover traveling along the track,
      the controller receives the analog feedback signal as the mover travels between a first position and a second position proximate the position sensor, and
      an amplitude of the analog feedback signal varies as the mover travels between the first position and the second position defining a waveform for the analog feedback signal;
   detecting a change in the analog feedback signal from a nominal value of the waveform for the analog feedback signal as the mover travels between the first position and the second position, wherein:
      the nominal value of the waveform is stored in memory of the controller, and
      the waveform received from the position sensor is compared to the nominal value stored in memory; and
   adapting operation of the linear drive system when the change in the analog feedback signal exceeds a predefined threshold.

15. The method of claim 14, wherein the nominal value stored is a nominal peak value of the analog signal, the method further comprising the step of storing a peak value of the analog feedback signal as the mover travels between the first position and the second position, wherein the step of detecting the change in the analog feedback signal from the nominal value of the waveform for the analog feedback signal further comprises comparing the peak value of the analog feedback signal between the first position and the second position to the nominal peak value of the analog feedback signal.

16. The method of claim 14, wherein the nominal value stored is a nominal area under the waveform generated by the analog feedback signal as the mover travels between the first position and the second position, the method further comprising the step of determining an area under the waveform generated by the analog feedback signal as the mover travels between the first position and the second position, wherein the step of detecting the change in the analog feedback signal from the nominal value of the waveform for the analog feedback signal further comprises comparing the area under the waveform to the nominal area under the curve.

17. The method of claim 16, wherein the step of determining the area under the waveform generated by the analog feedback signal as the mover travels between the first position and the second position further comprises the steps of:
  sampling a value of the analog feedback signal with the controller at a periodic interval; and
  integrating the value sampled at a plurality of periodic intervals as the mover travels between the first and the second position.

18. The method of claim 14, wherein the step of adapting operation of the linear drive system when the change in the analog feedback signal exceeds the predefined threshold further comprises entering a safe torque off operating mode with the controller for the linear drive system.

19. The method of claim 14, wherein the step of adapting operation of the linear drive system when the change in the analog feedback signal exceeds the predefined threshold further comprises dynamically changing at least one value of a controller gain for the linear drive system as the mover is travelling along the track.

20. The method of claim 14, wherein the step of adapting operation of the linear drive system when the change in the analog feedback signal exceeds the predefined threshold further comprises dynamically reducing a maximum current limit for the linear drive system as the mover is travelling along the track.

\* \* \* \* \*